United States Patent [19]

Miles

[11] Patent Number: 5,662,477

[45] Date of Patent: Sep. 2, 1997

[54] DEMONSTRATIVE PUPPET FOR PHONETIC TRAINING OF PERSONS HAVING SPEECH AND/OR HEARING DISORDERS

[76] Inventor: Janet A. Miles, 3 Windflower, Coto De Caza, Calif. 92679

[21] Appl. No.: 502,967

[22] Filed: Jul. 17, 1995

[51] Int. Cl.⁶ .................................................. G09B 19/04
[52] U.S. Cl. .......................................... 434/185; 434/270
[58] Field of Search ................................ 446/329, 328, 446/327, 395; 434/262, 367, 270, 269, 185, 156

[56] References Cited

U.S. PATENT DOCUMENTS

| | | | |
|---|---|---|---|
| 1,850,899 | 3/1932 | Smith | 434/185 |
| 2,929,170 | 3/1960 | Brown et al. | 446/329 |
| 3,410,003 | 11/1968 | Sovijarvi et al. | 434/185 |
| 3,942,283 | 3/1976 | Rushton | 496/327 |
| 4,096,645 | 6/1978 | Mandl | 434/185 |
| 4,209,919 | 7/1980 | Kirikae | 434/270 |
| 4,244,142 | 1/1981 | Crawford | 446/329 |
| 4,778,172 | 10/1988 | Bryan | 446/395 |
| 4,944,710 | 7/1990 | Sommers | 446/329 |
| 5,080,626 | 1/1992 | Maddi | 446/329 |
| 5,117,507 | 6/1992 | Long | 446/329 |

FOREIGN PATENT DOCUMENTS

| | | | |
|---|---|---|---|
| 604520 | 3/1960 | Italy | 446/329 |
| 1789 | of 1911 | United Kingdom | 446/329 |
| 2121587 | 12/1983 | United Kingdom | 434/185 |
| 8802272 | 4/1988 | WIPO | 446/329 |

*Primary Examiner*—Paul J. Hirsch
*Attorney, Agent, or Firm*—Stetina Brunda & Buyan

[57] ABSTRACT

A puppet for demonstrating the preferred positioning of oral anatomical structures (e.g., mouth, tongue, hard palate, incisor teeth) when making various audible phonetic sounds. Generally, the puppet comprises a puppet body having an upper jaw, a lower jaw, an oral cavity, a tongue, and at least one tooth extending downwardly from the upper jaw. A hand insertion passageway is formed in the puppet body and leads into a plurality of digit-receiving spaces or pouches formed in the upper jaw, tongue and lower jaw. Thus, the user's hand may be inserted into the puppet such that selected digits of the user's hand become positioned within selected ones of the digit-receiving spaces. Thereafter the digits of the user's hand may be moved or manipulated to cause the desired movement and relative positioning of the oral anatomical structures. In this regard, the invention is usable to demonstrate proper formation of certain phonetic sounds, thereby facilitating the administration of speech therapy or training to persons who are affected with speech and/or hearing disorders.

19 Claims, 1 Drawing Sheet

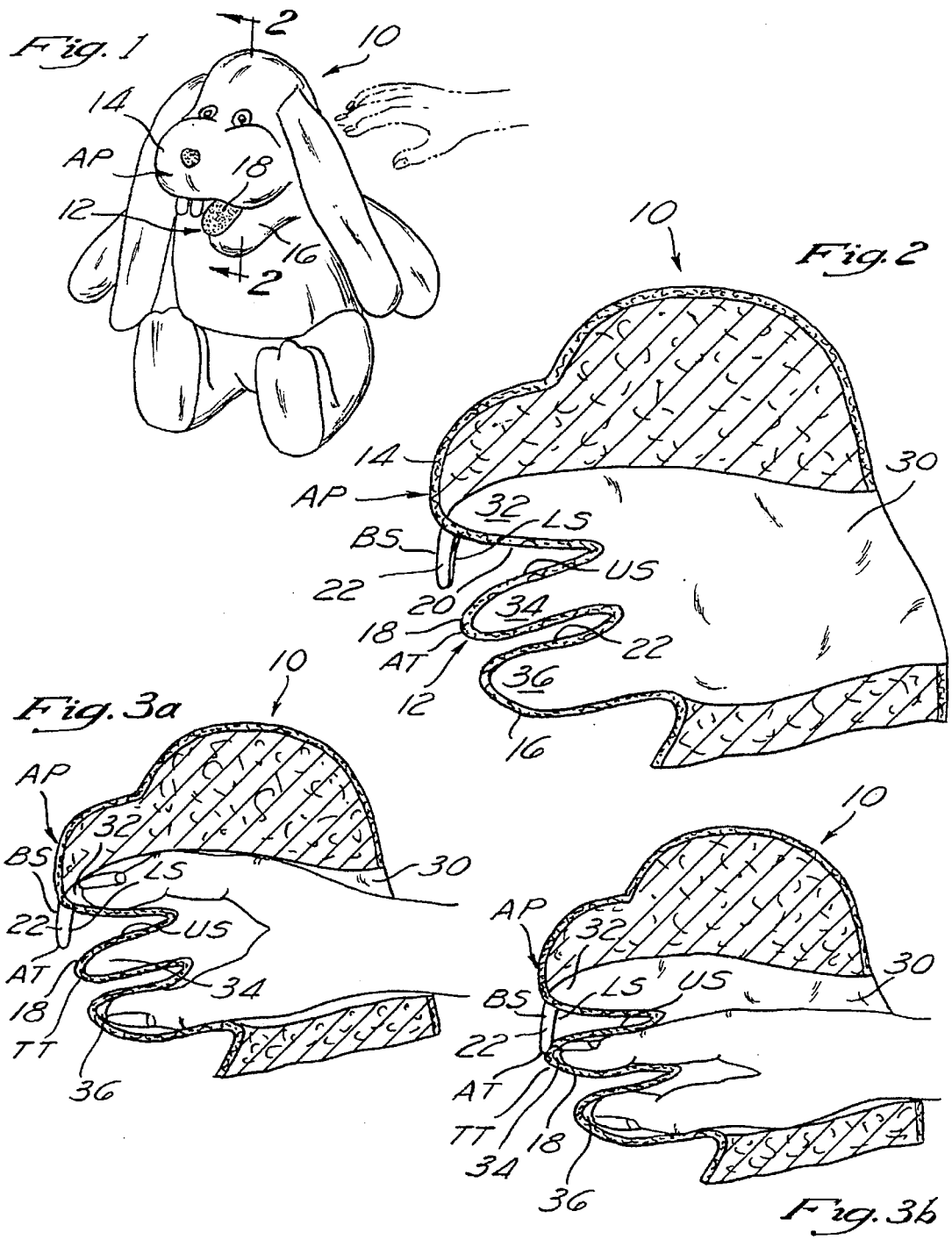

DEMONSTRATIVE PUPPET FOR PHONETIC TRAINING OF PERSONS HAVING SPEECH AND/OR HEARING DISORDERS

FIELD OF THE INVENTION

The present invention relates to demonstrative aids utilized in training or education, and more particularly to a demonstrative hand puppet which may be utilized to demonstrate proper positioning of the mouth and tongue relative to the front teeth when articulating various phonetic sounds.

BACKGROUND OF THE INVENTION

Speech and/or language disorders have been known to affect human beings of all ages. Such disorders may result from various causes including, but not limited to, learning disabilities, mental retardation, brain injury, minimal brain disfunction, hearing impairment, stroke, habitual mispronunciation, or physical causes (e.g., cleft lip). In some individuals, language or speech disorders can not be linked to any discernable physical or non-physical cause.

Irrespective of the cause or etiology of an individual's language or speech disorder, such disorders may typically be improved or remedied if appropriate speech and/or language therapy is provided to the affected individual by a qualified speech pathologist.

Speech therapy often entails instructing the affected individual as to the proper positioning of the mouth, lips and tongue when making the audible phonetic sounds necessary for effective verbal communication. The following are some examples of the preferred positioning of the mouth, lips and tongue when making certain phonetic sounds:

For M, B and P sounds the mouth is closed and the lips are pursed in a manner which conceals the teeth;

For V and F sounds the mouth is closed and the lips are slightly parted in a manner which leaves the teeth slightly unconcealed;

For T, D, N, L and R sounds the mouth is opened and the tongue is placed in various positions relative to the lingual surface of the top front incisor teeth, in contact with specific sites on the hard palate;

For "TH" sounds the lips are slightly open and the tongue is placed in contact with the apical tips of the upper central incisor teeth.

It is often difficult for the speech pathologist to physically demonstrate the proper relative positioning of the mouth, lips, teeth and tongue for each of the required phonetic sounds. Thus, there exists a need in the art for the development of a demonstrative device or apparatus which may be used to clearly demonstrate the relative positioning of the mouth, lips, teeth and tongue to affected individuals who are undergoing speech therapy.

SUMMARY OF THE INVENTION

The present invention is a speech demonstration puppet comprising, a puppet body which has an oral cavity, an upper jaw, a lower jaw, a tongue and at least one tooth extending downwardly from the upper jaw. A hand insertion passageway is formed in the puppet body, to permit insertion of a human hand thereinto. The hand insertion passageway provides access to a plurality of digit receiving spaces which are formed in the upper jaw, tongue and lower jaw of the puppet body. In this regard, the user's hand may be inserted through the hand insertion passageway, and selected digits of the user's hand may be positioned within selected ones of the digit receiving spaces. The digits of the user's hand may then be moved or manipulated so as to cause selective movement of the upper jaw, tongue and/or lower jaw of the puppet. Thus, the user is able to selectively mimic the desired positioning of the upper jaw, lower jaw, and tongue of a human being, when making certain phonetic sounds.

Further in accordance with the invention, the "at least one tooth" which extends downwardly from the upper jaw of the puppet preferably comprises a plurality of incisor-like teeth which extend downwardly from the anterior-most aspect of the upper jaw, thereby mimicking the positioning the central incisor teeth of a human being.

Further in accordance with the invention, there is provided a method of demonstrating the preferred positioning of selected oral anatomical structures (e.g., tongue, mouth, hard palate, front incisor teeth) using the speech demonstration puppet of the foregoing character. In general, the user's hand is inserted into the hand insertion passageway and selected digits of the hand are positioned within the digit-receiving spaces of the upper jaw, tongue and/or lower jaw of the puppet. Thereafter, the digits of the hand are moved and/or positioned so as to provide the desired movement of the oral anatomical structures.

Further objects and advantages of the invention will become apparent to those skilled in the art upon reading and understanding of the following detailed description, and upon consideration of the accompanying drawings.

BRIEF DESCRIPTION OF THE DRAWINGS

FIG. 1 is a perspective view of a demonstrative hand puppet of the present invention.

FIG. 2 is a longitudinal sectional view through line 2—2 of FIG. 1.

FIG. 3a is a longitudinal sectional view through line 2—2 of FIG. 1 showing the manner in which a user's hand is inserted into the puppet to perform articulation and movement of the mouth and lips.

FIG. 3b is a longitudinal sectional view through line 2—2 of FIG. 1 showing the manner in which a user's hand is inserted into the puppet to provide for articulation and movement of the tongue relative to the hard palate and teeth.

DETAILED DESCRIPTION OF A PREFERRED EMBODIMENT

The following detailed description and the accompanying drawings are provided for the purpose of describing a presently preferred embodiment of the invention only, and are not intended to describe the only embodiment or form in which the invention may be practiced.

With reference to the drawings, FIG. 1 shows a demonstrative hand puppet 10 in the form of a rabbit. The body of the puppet 10 has an oral cavity 12 formed between an upper jaw 14 and a lower jaw 16. The undersurface of the upper jaw 14 forms the roof 20 of the oral cavity 12 and has the general anatomical configuration and location of the hard palate of the human mouth. The roof 20 of the oral cavity need not, however, be of rigid or "hard" construction, and may be formed of soft fabric or hard material. The floor 22 of the oral cavity 12 is formed by the upper surface of the lower jaw 16.

A pliable tongue 18 extends forwardly into the oral cavity 12. The tongue 18 has an upper surface US and an anterior tip T.T.

Upper central incisor teeth 22 extend downwardly from the front or anterior portion AP of the upper jaw 14, as shown. The teeth 22 have buccal surfaces BS, lingual surfaces LS and apical tips AT.

A hand insertion passageway 30 extends into the pharyngeal area of the puppet 10, from the posterior aspect of the puppet's torso or neck. The hand insertion passageway 30 leads into digit receiving spaces comprising a upper jaw space 32, a tongue space 34 and a lower jaw space 36, as seen in FIG. 2.

When it is desired to use the puppet to demonstrate opening and closing of the mouth or other movement of the upper jaw 14 and/or lower jaw 16, the hand of the user will be inserted through the hand insertion passageway 30 and the user's thumb will preferably be inserted into the lower jaw space 36 while the user's fingers are inserted into the upper jaw space 32. (FIG. 3a) With the user's hand so positioned, the thumb and fingers of the user's hand may be moved or manipulated to cause corresponding movement and positioning of the upper jaw 14 and lower jaw 16. In this way the user may cause the oral cavity 12 to open and close. The opposite hand of the user may be employed to guide or position the teeth 22 in a manner which demonstrates proper positioning of the lips and teeth when forming specific phonetic sounds. For example, phonetic sounds such as "M", "B" and "P" may be demonstrated by closing of the oral cavity 12 with the teeth 22 inside, and the opposite hand of the user may be employed to make certain that the teeth 22 are disposed inside of the oral cavity 12 with the surrounding portions of the upper jaw 14 and lower jaw 16 sealing or closing therearound to represent the desired positioning of the lips. Alternatively, to demonstrate sounds such as "F" or "V", the mouth will be closed with the teeth 22 showing through a slightly parted region of the lips at the front of the mouth. In this regard, the user's other hand may be employed to slightly part the anterior portion AP of the upper jaw 14 from the lower jaw 16, at the front of the mouth, while the remaining portions of the upper jaw 14 and lower jaw 16 are maintained in abutting juxtaposition as would be typical of an anatomically closed human mouth.

Alternatively, when it is desired to demonstrate movement or positioning of the tongue 18, the user's hand may be inserted through the hand insertion passageway 30 such that the user's thumb becomes inserted within the lower jaw space 36 and 3 or 4 of the user's fingers become inserted within the tongue space 34. The finger's inserted in the tongue space 34 may then be moved, bowed or otherwise manipulated to cause specific movements and positions of the tongue 18, relative to the roof 20 of the oral cavity 12 and/or teeth 22. For some user's, especially those who are unaccustomed to using the puppet 10, it may sometimes be desirable to initially place the user's other hand under the lower jaw 16 to stabilize the lower jaw 16 while moving the fingers inserted in the tongue space 34 to produce the desired movement and positioning of the tongue 18. With the user's hand(s) so positioned, the puppet 10 may be conveniently used to demonstrate oral motor movements such as tongue lateralization, tongue elevation, lip licking, etc. For example, sounds such as "K" and "G" may be demonstrated by pulling of bending the fingers within the tongue space 34, in a rearward direction, to produce the desired curling of the tongue to produce such "K" and "G" sounds. For some users, it may be desirable to demonstrate such sounds by curling the tongue 18 around a pencil or finger of the other hand. Similarly, for sounds such as "TH" the tongue 18 will be brought into contact with the apical tip(s) AT of the teeth 22 and for sounds such a "L" the tip of the tongue TT will be brought into contact with the lingual surface LS of the teeth 22. When demonstrating such sounds wherein the tongue 18 is placed in contact with the teeth, a pencil or other elongate object may be positioned adjacent the buccal surfaces BS of the teeth 22 to hold the teeth 22 steady. This may be particularly important in embodiments of the puppet 10 wherein the teeth 22 are formed of non rigid, or loose material or fabric. In other embodiments of the puppet 10, the teeth 22 may be formed of material which is elastomeric or sufficiently rigid to eliminate any need for such stabilization of the teeth 22 during maneuvers such as the "L" or "TH" sound.

The specific positioning of the thumb and fingers of the user's hand, described hereabove, represent one possible method of utilizing the puppet. It will be appreciated that various users will devise alternative ways of positioning their hand(s), fingers and thumb within the available spaces 32, 34 and 36 to produce desirable demonstrative movement of the mouth, jaws 14, 16 and tongue 18 of the puppet 10.

Furthermore, it will be appreciated that the above-set-forth detailed description and the accompanying drawings are intended to show an example or embodiment of the invention, but are not intended to show every possible configuration or embodiment in which the invention may take physical form. For example, the body of the puppet 10 may be in the configuration of various animals or things, and need not necessarily be in the form of a rabbit, as shown in the drawings. Also, various cords, wires or other apparatus may be attached to the puppet and utilized to cause the desired movements of the upper jaw, lower jaw 16 and tongue 18, instead of the direct insertion of the users hand into the puppet body as described herein. Furthermore, the hand insertion passageway 30 and digit-receiving spaces 32, 34, 36 formed within the body of the puppet 10 may have various shapes or configurations to facilitate appropriate positioning of the user's hand therewithin and to produce the desired movement of the upper and lower jaws 14 16 and tongue 18. Accordingly, it is intended that all foreseeable modifications or rearrangements of the above-described embodiment be included within the scope of the following claims.

What is claimed is:

1. A speech demonstration puppet, said puppet comprising:

a puppet body having an oral cavity, an upper jaw, a lower jaw, a tongue and at least one tooth extending downwardly from the upper jaw;

a hand insertion passageway formed in said puppet body to facilitate insertion of a human hand thereinto, said hand insertion passageway extending into a plurality of digit receiving spaces comprising:

i) an upper jaw space formed within the upper jaw of the puppet body;

ii) a tongue space formed within the tongue of the puppet body; and, iii) a lower jaw space formed within the lower jaw of the puppet body;

said puppet being thereby configured such that the human hand may be inserted through said hand insertion passageway, and selected digits of said hand may be positioned within selected ones of said digit receiving spaces such that movement of said digits will cause selective movement of at least one of said upper jaw, tongue and lower jaw.

2. The speech demonstration puppet of claim 1 wherein at least one of said a) upper jaw and b) lower jaw is moveable relative to the other to open and close said oral cavity.

3. The speech demonstration puppet of claim 1 wherein said tongue is formed of pliable material such that said tongue may be placed in various positions which are mimetic of the normal anatomical positioning of the human tongue during the creation of the phonetic sounds utilized during human speech.

4. The speech demonstration puppet of claim 1 wherein said puppet body has an anterior side and a posterior side, and wherein said at least one tooth extends downwardly from an anterior portion of said upper jaw such that said tooth is in the position of an upper central incisor tooth of a human being.

5. The speech demonstration puppet of claim 4 wherein said tooth has a lingual surface, and wherein the tongue of said puppet body is sufficiently pliable to be manipulated by said human hand such that a portion of said tongue contacts the lingual surface of said tooth.

6. The speech demonstration puppet of claim 1 wherein said puppet body is formed of materials which are machine washable.

7. A method of demonstrating the positioning of oral anatomical structures using the speech demonstration puppet of claim 1, said method comprising the steps of:

a) providing a puppet in accordance with claim 1;

b) inserting a human hand into said puppet body, through said hand insertion passageway;

c) passing selected digits of the human hand into selected ones of said digit receiving spaces; and, d) moving the digits of said hand so as to cause movement of at least one of said upper jaw, lower jaw and tongue.

8. The method of claim 7 wherein step c comprises:

passing the thumb of said human hand into the lower jaw space of said puppet and at least one finger of said hand into the upper jaw space of said puppet; and, wherein step d comprises:

moving said digits to control opening and closing of the oral cavity of said puppet.

9. The method of claim 7 wherein step c comprises:

passing the thumb of the human hand into said lower jaw space and at least one digit of the hand into said tongue space; and, wherein step d comprises:

moving the digits of said hand so as to cause controlled movement of the tongue within the oral cavity.

10. The method of claim 9 wherein the puppet provided in step a has a roof of the oral cavity formed on the underside of the upper jaw, and wherein step d further comprises:

causing the tongue to be placed in contact with the roof of said oral cavity formed on the underside of the upper jaw of said puppet.

11. The method of claim 9 wherein step d comprises placing the tongue in contact with said at least one tooth.

12. The method of claim 11 wherein the lower jaw of said puppet body has an anterior portion and said at least one tooth extends downwardly from the anterior portion of said upper jaw to mimic the positioning of a central incisor tooth of a human being, and wherein step d further comprises:

placing a portion of the tongue in contact with said tooth.

13. The method of claim 12 wherein said tooth has a buccal surface, a lingual surface and an apical tip, and wherein step d further comprises:

placing said tongue in contact with the lingual surface of said tooth.

14. The method of claim 12 wherein said tooth has a buccal surface, a lingual surface and an apical tip, and wherein step d further comprises:

placing said tongue in contact with the apical tip of the tooth.

15. A puppet for demonstrative training of persons having speech and/or hearing disorders, said puppet comprising:

a puppet body having an upper jaw, a lower jaw, an oral cavity, tongue disposed within said oral cavity, and at least one tooth extending downwardly from the upper jaw;

said tongue being moveable such that said tongue may be placed in various positions to mimic the proper positioning of the human tongue when making phonetic speech sounds;

said various positions in which said tongue is positionable including at least one position wherein said tongue is in contact with said at least one tooth.

16. The puppet of claim 15 wherein the oral cavity of said puppet body has an upper surface, said upper surface being analogous to the hard pallet of the human oral cavity, and wherein:

said various positions in which said tongue is positionable further include at least one position wherein said tongue is in contact with said upper surface of said oral cavity.

17. The puppet of claim 15 wherein a digit-receiving cavity is formed within the tongue to permit selected digits of the user's hand to be inserted into said tongue, and wherein movement of said tongue is accomplished by movement of the digit(s) of the user's hand which have been inserted into the digit-receiving cavity of the tongue.

18. The puppet of claim 15 wherein a digit-receiving cavity is formed within the upper jaw of said puppet, such that at least one digit of the user's hand may be inserted into the upper jaw of the puppet, and wherein movement of said upper jaw is accomplished by movement of the digit(s) of the user's hand inserted within the digit receiving cavity of the upper jaw.

19. The puppet of claim 15 wherein a digit-receiving cavity is formed within the lower jaw of said puppet, such that at least one digit of the user's hand may be inserted into the lower jaw of the puppet, and wherein movement of said lower jaw is accomplished by movement of the digit(s) of the user's hand inserted into the digit-receiving cavity of said lower jaw.

* * * * *